United States Patent
Adler et al.

[11] Patent Number: 5,816,358
[45] Date of Patent: Oct. 6, 1998

[54] ELECTRIC VEHICLE WITH CIRCUIT BREAKERS

[75] Inventors: Uwe Adler, Kolitzheim; Michael Wagner, Niederwerrn, both of Germany

[73] Assignee: Fichtel & Sachs AG, Schweinfurt, Germany

[21] Appl. No.: 581,511

[22] PCT Filed: Jun. 20, 1994

[86] PCT No.: PCT/DE94/00760

§ 371 Date: Jan. 11, 1996

§ 102(e) Date: Jan. 11, 1996

[87] PCT Pub. No.: WO95/01887

PCT Pub. Date: Jan. 19, 1995

[30] Foreign Application Priority Data

Jul. 9, 1993 [DE] Germany .......................... 43 23 604.9

[51] Int. Cl.⁶ .............................. B60K 28/14; B60L 3/00
[52] U.S. Cl. ...................... 180/279; 180/282; 180/65.8; 307/10.1
[58] Field of Search ..................... 180/279, 274, 180/277, 282, 283, 284, 65.8, 65.1; 364/424.026, 424.055; 307/10.1

[56] References Cited

U.S. PATENT DOCUMENTS

| | | | |
|---|---|---|---|
| 5,238,083 | 8/1993 | Horie et al. .............................. | 180/274 |
| 5,389,824 | 2/1995 | Moroto et al. ........................... | 180/283 |
| 5,483,447 | 1/1996 | Jeenicke et al. ......................... | 180/274 |
| 5,510,658 | 4/1996 | Nakayama .............................. | 180/65.8 |
| 5,565,711 | 10/1996 | Hagiwara ............................... | 180/282 |
| 5,577,569 | 11/1996 | Nakashima .............................. | 180/279 |

FOREIGN PATENT DOCUMENTS 41 33 014  4/1993  Germany .

*Primary Examiner*—Brian L. Johnson
*Assistant Examiner*—Peter C. English
*Attorney, Agent, or Firm*—Cohen, Pontani, Lieberman & Pavane

[57] ABSTRACT

An electrically powered vehicle including an electric motor connected to drive a wheel of the vehicle. The electric motor receives a supply of electric current from a power source; a power electronics device and superordinated controller regulate the current supply based upon signals received from a driver or operator of the vehicle. A sensor for sensing data indicative of an accident or impending accident is connected to the superordinated controller in which the sensed data is compared to predetermined limit values to determine if an accident situation exists. Upon determining that an accident situation exists, the superordinated controller activates a circuit breaker to disconnect the electric power supply and thereby interrupt the supply of electric current to the electric motor.

10 Claims, 2 Drawing Sheets

ELECTRIC VEHICLE WITH CIRCUIT BREAKERS

BACKGROUND OF THE INVENTION

1. Field of the Invention

The invention relates to a vehicle with at least one electric motor and, more particularly, to an electrically powered vehicle having at least one electric motor for driving a respective wheel of the vehicle, the at least one electric motor being supplied with a driving current by a power source. The amount of current supplied is controlled by a power electronic device and a superordinated electronic controller based upon control signals received from a driver of the vehicle.

2. Description of the Prior Art

Among vehicles with an electric drive train, a distinction is made between purely electric vehicles (electric battery vehicles) and electric hybrid vehicles. The latter, in turn, are subdivided into different types according to the relationship between the electric drive train and the drive train of the internal combustion engine: serial, parallel and split-hybrid. There are also vehicles with electric drive motors that draw their electric drive power from a mechanically-connected internal combustion engine/generator unit. Such vehicles, when equipped with suitable storage devices (e.g., electric accumulators, flywheel storage devices with generator coupling), can also be operated as purely electric vehicles, at least for a certain time, using the electric drive alone without the simultaneous use of the internal combustion engine. Fuel cells can also serve as the electric power source for electrically driven vehicles. Not included in the framework of the present invention are vehicles that draw their electric drive power continually from an external power network, i.e., a network not carried within the vehicle itself.

A vehicle is known from German Patent Application No. DE 41 33 014 A1 in which each of the four wheels is driven by its own respective electric motor. The power for all of the electric motors is supplied via a power distributor, which is designed as a power electronics system and is controlled by an electronic controller. The power distributor is connected to an electric generator, which is driven by an internal combustion engine. The electric power produced by the generator can be supplied directly to the electric motors; however, it is also possible to feed some or all of the electric energy into an accumulator attached to the current distributor for temporary storage. In certain operational phases (e.g., when driving in emission-protected urban areas), the electric driving power can be supplied by the accumulator alone.

In order to make an electric vehicle sufficiently attractive, it is necessary to improve its driving performance to at least approach the range of conventionally powered vehicles. This means that motors having a very high power capacity, relative to the structural volume tolerable in electric motors, are required. In view of the required output (e.g., at least 20 or 30 kW) this demand can be met, practically speaking, only when the power is supplied at high voltage. What is meant here by high voltage is a voltage substantially higher than the operating voltage of an on-board vehicle service network, which is usually only 12 or 24 V. As a rule, the voltage is markedly higher than 100 V, for example, 650 V, and may be even higher for some applications.

From DE-A-31 16 867 it is known that the acceleration switch for the airbag also serves to switch, for example, the fuel pump, the central locking and the emergency flasher system.

Furthermore, it is known from FR-A-23 40 219 to interrupt the electric circuit for the generator and the battery during an accident by means of mechanical rods.

However, this becomes problematic in the case of the aforementioned high voltages.

Needless to say, this high voltage is accompanied by a certain potential danger in the event of malfunction because it is applied over a relatively long period of time and results in consistently high electric outputs. In contrast, the potential danger associated with the ignition coil of an internal combustion engine is significantly lower, even though the coil does supply very high voltages, because the current flow lasts only for a very short time and thus, on the chronological average, very low outputs are produced.

SUMMARY OF THE INVENTION

The object of the invention is therefore to further develop a generic vehicle in such a way that danger to persons inside and outside the vehicle and persons coming into contact with the vehicle, especially in the event of an accident, can be precluded to the greatest extent possible.

This object is attained by providing protective circuit breakers for disconnecting each power source from their respective electric motor upon sensing and determining an accident situation is imminent or has just occurred. Advantageous further features of the vehicle according to the invention include operating each of the electric motors as a generator; providing a circuit breaker for disconnecting the electric motor upon sensing an accident situation; short circuiting the windings of the electric motor upon sensing an accident situation; sensing at least one of transverse acceleration of the vehicle, longitudinal acceleration of the vehicle, ground clearance of the vehicle, insulation damage to the electric circuits and an error in supplied current or voltage; connecting the sensor as part of an airbag system; and coupling the circuit breakers to trigger a security system and provide added security to protect the vehicle from theft.

The basic idea of the invention is to switch the electric circuits in the vehicle that connect the power source or sources to the electric motors used for drive power into a current-free state as soon as possible upon recognition of an accident situation, in such a way that interruption takes place in the immediate spatial vicinity of each power source. This occurs automatically; if possible, before external forces impact upon and damage the vehicle or, at the latest, at the very beginning of such impact and prior to the occurrence of any damage to the electric circuits. To this end, a sensor device is provided, which determines the characteristic data of an (as applicable, just beginning) accident and reports this data to an electronic controller that controls, in the manner of automatic or process control engineering, all of the power-supply devices in the vehicle. The electronic controller contains an evaluation logic which, based upon a comparison between the reported data and the stored limit values for critical data (e.g., longitudinal and transversal acceleration, ground clearance), recognizes an accident situation and (indirectly) triggers one or more protective circuit breakers that switch the circuit network to a current-free state. Power sources to be switched off in this manner may include any desired vehicle-internal sources of current, particularly electric accumulators, internal combustion engine/generator units and fuel cells.

Because electric motors can also function as generators when the vehicle is coasting, i.e., because these motors themselves can produce an electric current which is fed back into the circuit network of the vehicle and which represents a potential danger in the event of an accident, it is also advantageous to separate the electric motors from the circuit network in their immediate vicinity and to provide suitable protective circuit breakers for this purpose. In order to eliminate the rotational energy of vehicle wheels which continue to turn freely after an accident, a further development of the invention permits the electric windings of the electric motor associated with the vehicle wheel in question to be short-circuited via brake resistances by a separate or a suitably multi-functional protective circuit breaker arrangement for this motor.

When the electric motors are designed, for example, as permanent magneto-electric direct-current motors with electronic commutation and when the electric current is drawn for at least a time from an internal combustion engine/generator unit, it is advantageous to provide a constant voltage d.c. link equipped with capacitors, into which the generator feeds and from which the power electronics system of the electric motors draws the driving current. In such a case, the electric power stored in this constant voltage d.c. link also represents a potential danger in the event of accident. In an advantageous further development, the invention therefore calls for the electronic controller, upon recognition of an accident, to activate one or more protective circuit breakers, which ensure the controlled discharge of the capacitors via electric resistances arranged in the immediate vicinity or at least ensure the separation of the capacitors from the circuit network.

The sensors used for recognizing an accident which has occurred or is imminent may include, in particular, sensors that measure the longitudinal or transversal acceleration of the vehicle (or suitable equivalent variables) and/or its ground clearance. Advantageously, use is made of the sensor technology and evaluation logic already contained in the vehicle if the vehicle has an airbag system. In addition, it is advisable to supplement the sensor technology with insulation sentinels to determine insulation damage (resulting from longtime wear or material defect) to the circuit network and/or with devices to detect fault current or fault voltage. This adds extra safety in the event of an accident, and also substantially reduces the risk of accident when the vehicle is not in operation or is undergoing manual intervention during maintenance or repair work. A vehicle outfitted according to the invention offers the additional advantage of better protection against unauthorized start-up (theft), because when the ignition key is withdrawn, advantageously, all of the protective circuit breakers are automatically in the current-interrupting position.

BRIEF DESCRIPTION OF THE DRAWINGS

The invention is described below in greater detail with reference to the example shown in the drawings. The drawings show.

DETAILED DESCRIPTION OF THE PRESENTLY PREFERRED EMBODIMENTS

Figure 1:
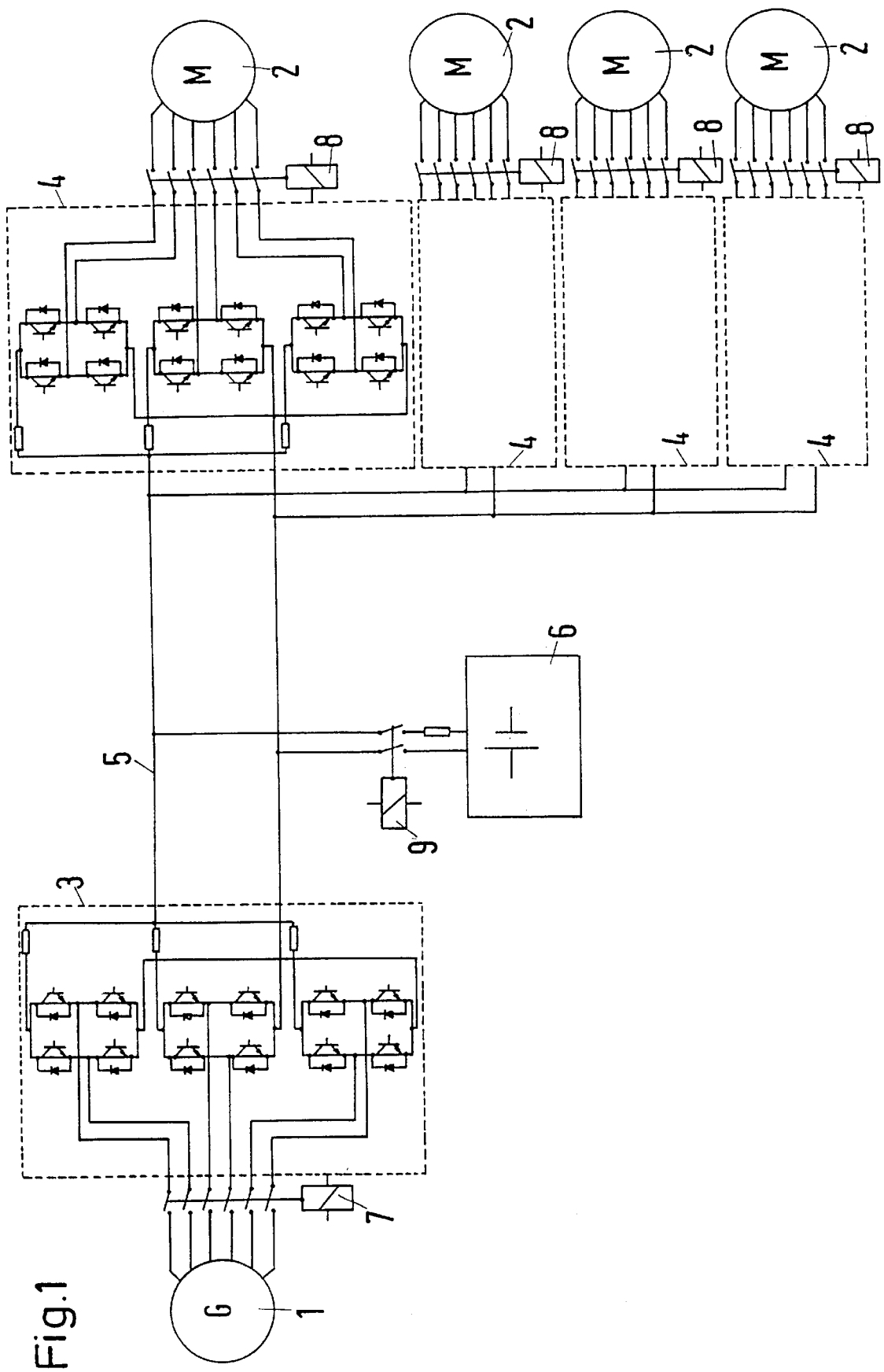
FIG. 1 A circuit diagram for the power supply of a vehicle according to the invention.
Figure 2:
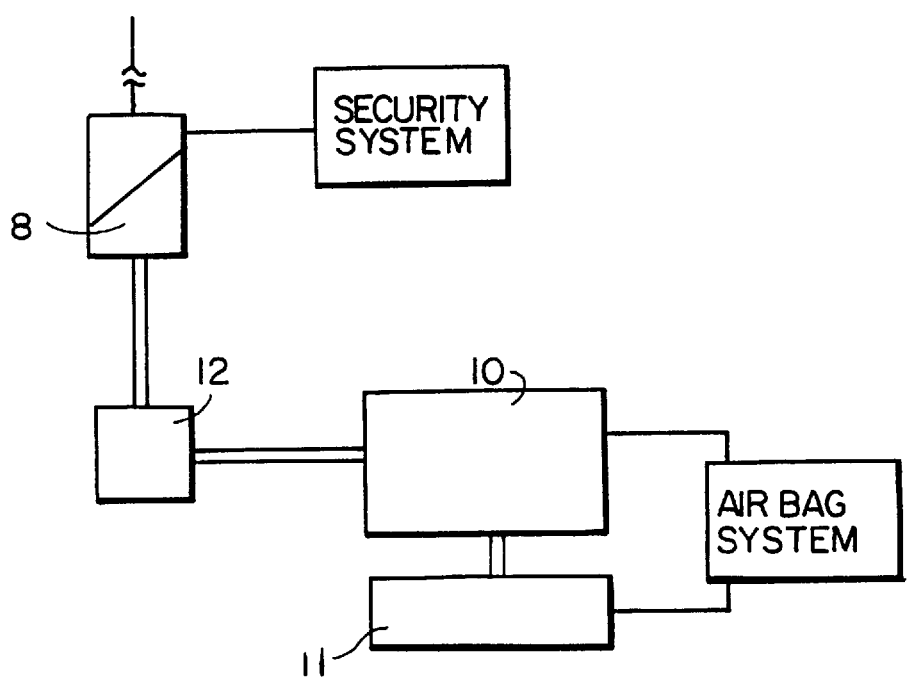
FIG. 2 A block diagram of the circuit for triggering of a protective circuit breaker in accordance with the present invention.

The power supply shown in FIG. 1 has, for example, a generator 1 driven by an internal combustion engine (not shown) carried within the vehicle. The generator 1 feeds its current unidirectionally into the circuit network 5 via a power electronics system 3, which is controlled by an electronic controller 10 (see FIG. 2). The driving current for the four respective electric driving motors 2 of the vehicle is taken from the circuit network 5 via separate power electronics units 4, only one of which is shown in detail in the drawing and all of which are controlled by the electronic controller of the vehicle (not shown). In addition, the vehicle has an accumulator 6 which serves as an electric intermediate storage device, which is charged by the generator 1 and can be used as the sole power supply when the generator 1 is switched off. The operating voltage in the circuit network 5 is 650 V, for example, and the electric motors 2 have a respective nominal output power of 24 kW each, for example. In order to preclude the risk of personal injury from electric shocks in the event of an accident, there is a protective circuit breaker arrangement consisting of the protective circuit breakers 7, 8 and 9, which can interrupt the particular circuit connections to the generator 1, the four electric motors 2 and/or the accumulator 6 respectively in their immediate vicinity. As FIG. 2 shows for the protective circuit breaker 8, this occurs as follows: continuous characteristic data that are characteristic for an accident are reported by the sensor device 11 to the superordinated electronic controller 10 of the vehicle; the electronic controller 10 recognizes from these data, when certain stored limit values are exceeded, that there is an accident.

A recognized accident leads to immediate activation of a control relay 12, which in turn activates the protective circuit breaker 8 (and, as applicable, further protective circuit breakers) and causes the circuit network in the vehicle to be switched to the current-less state.

We claim:

1. An electrically powered vehicle, comprising:
   a plurality of wheels;
   a plurality of electric motors, each said electric motor being operative for driving a respective one of said plurality of wheels, and each said electric motor being operable to generate an electric current in response to unpowered rotation of the respective wheel;
   an electric power source for supplying electric current to said electric motors;
   a first circuit breaker connected between said electric motors and said electric power source and operable to switch between a first condition in which said circuit breaker normally supplies electric current from said power source to said electric motors and a second condition in which said circuit breaker interrupts and discontinues said supply of electric current to said electric motors;
   a sensor device for sensing data potentially indicative of an accident situation of the vehicle and for outputting the sensed data;
   a superordinated electronic controller connected to said sensor device for storing predetermined data indicative of an accident situation, for receiving input signals from a driver of the vehicle, and for outputting a vehicle control signal for use in operating said electric motors in accordance with said input signals from a driver of the vehicle, said electronic controller being connected to said sensor device for receiving said sensed data and being operable for comparing said sensed data to said stored predetermined data for identifying an occurrence of an accident situation, and said electronic controller being connected to said circuit breaker for operatively switching said circuit breaker from said first condition to said second condition to interrupt and discontinue said supply of electric current to the electric motors when said electronic controller identifies an occurrence of an accident situation by comparing said sensed data to said stored predetermined data;

a power electronics device connected to said electronic controller and between said electric motors and said electric power source for regulating the supply of current to said electric motors from said power source in accordance with said vehicle control signal output by said electronic controller; and a plurality of second circuit breakers each connected to a respective one of said plurality of electric motors and to said electronic controller, each of said second circuit breakers being operable by said electronic controller to electrically disconnect the respective electric motor when said electronic controller identifies an occurrence of an accident situation.

2. The vehicle of claim 1, wherein each said electric motor includes an electric winding, and wherein said each said second circuit breaker being further operable to short the electric winding of the respective electric motor to effect braking of the respective wheel when said electronic controller identifies an occurrence of an accident situation.

3. The vehicle of claim 1, wherein said sensor device includes at least one sensor for sensing transverse acceleration of said vehicle.

4. The vehicle of claim 1, wherein said sensor device includes at least one sensor for sensing longitudinal acceleration of said vehicle.

5. The vehicle of claim 1, wherein said sensor device includes at least one sensor for sensing a ground clearance of said vehicle.

6. The vehicle of claim 1, further comprising an airbag system connected to at least one of said sensor device and said electronic controller.

7. The vehicle of claim 1, wherein said sensor device includes at least one sensor for sensing an amount of current supplied to said electric motors.

8. An electrically powered vehicle, comprising:

at least one wheel;

at least one electric motor operable for driving the at least one wheel;

an electric power source for supplying electric current to said at least one electric motor, said electric power source comprising an internal combustion engine/generator unit;

a first circuit breaker connected between said electric motor and said electric power source and operable to switch between a first condition in which said circuit breaker normally supplies electric current from said power source to said electric motor and a second condition in which said circuit breaker interrupts and discontinues said supply of electric current to said electric motor;

a sensor device for sensing data potentially indicative of an accident situation of the vehicle and for outputting the sensed data;

a superordinated electronic controller connected to said sensor device for storing predetermined data indicative of an accident situation, for receiving input signals from a driver of the vehicle, and for outputting a vehicle control signal for use in operating said electric motor in accordance with said input signals from a driver of the vehicle, said electronic controller being connected to said sensor device for receiving said sensed data and being operable for comparing said sensed data to said stored predetermined data for identifying an occurrence of an accident situation, and said electronic controller being connected to said circuit breaker for operatively switching said circuit breaker from said first condition to said second condition to interrupt and discontinue said supply of electric current to the electric motor when said electronic controller identifies an occurrence of an accident situation by comparing said sensed data to said stored predetermined data;

a power electronics device connected to said electronic controller and between said at least one electric motor and said electric power source for regulating the supply of current to said at least one electric motor from said power source in accordance with said vehicle control signal output by said electronic controller; and a constant voltage direct current link including a capacitor connecting said internal combustion engine/generator unit to said electric motor and a second circuit breaker connected to said electronic controller and operable to discharge said capacitor when said electronic controller identifies an occurrence of an accident situation.

9. An electrically powered vehicle, comprising:

at least one wheel;

at least one electric motor operable for driving the at least one wheel;

an electric power source for supplying electric current to said at least one electric motor;

a first circuit breaker connected between said electric motor and said electric power source and operable to switch between a first condition in which said circuit breaker normally supplies electric current from said power source to said electric motor and a second condition in which said circuit breaker interrupts and discontinues said supply of electric current to said electric motor;

a sensor device for sensing data potentially indicative of an accident situation of the vehicle and for outputting the sensed data;

a superordinated electronic controller connected to said sensor device for storing predetermined data indicative of an accident situation, for receiving input signals from a driver of the vehicle, and for outputting a vehicle control signal for use in operating said electric motor in accordance with said input signals from a driver of the vehicle, said electronic controller being connected to said sensor device for receiving said sensed data and being operable for comparing said sensed data to said stored predetermined data for identifying an occurrence of an accident situation, and said electronic controller being connected to said circuit breaker for operatively switching said circuit breaker from said first condition to said second condition to interrupt and discontinue said supply of electric current to the electric motor when said electronic controller identifies an occurrence of an accident situation by comparing said sensed data to said stored predetermined data; and a power electronics device connected to said electronic controller and between said at least one electric motor and said electric power source for regulating the supply of current to said at least one electric motor from said power source in accordance with said vehicle control signal output by said electronic controller, at least one of said electric power source, said at least one electric motor, said superordinated electronic controller, and said power electronics device include electrical insulation, and said sensor device includes a sensor for sensing damage to said insulation.

10. An electrically powered vehicle, comprising:

at least one wheel;

at least one electric motor operable for driving the at least one wheel;

an electric power source for supplying electric current to said at least one electric motor;

a first circuit breaker connected between said electric motor and said electric power source and operable to switch between a first condition in which said circuit breaker normally supplies electric current from said power source to said electric motor and a second condition in which said circuit breaker interrupts and discontinues said supply of electric current to said electric motor;

a sensor device for sensing data potentially indicative of an accident situation of the vehicle and for outputting the sensed data;

a superordinated electronic controller connected to said sensor device for storing predetermined data indicative of an accident situation, for receiving input signals from a driver of the vehicle, and for outputting a vehicle control signal for use in operating said electric motor in accordance with said input signals from a driver of the vehicle, said electronic controller being connected to said sensor device for receiving said sensed data and being operable for comparing said sensed data to said stored predetermined data for identifying an occurrence of an accident situation, and said electronic controller being connected to said circuit breaker for operatively switching said circuit breaker from said first condition to said second condition to interrupt and discontinue said supply of electric current to the electric motor when said electronic controller identifies an occurrence of an accident situation by comparing said sensed data to said stored predetermined data;

a power electronics device connected to said electronic controller and between said at least one electric motor and said electric power source for regulating the supply of current to said at least one electric motor from said power source in accordance with said vehicle control signal output by said electronic controller; and a security system connected to and activated by switching of said first circuit breaker from said first to said second condition.

* * * * *